United States Patent [19]
Main et al.

[11] Patent Number: 5,893,905
[45] Date of Patent: Apr. 13, 1999

[54] AUTOMATED SLA PERFORMANCE ANALYSIS MONITOR WITH IMPACT ALERTS ON DOWNSTREAM JOBS

[75] Inventors: Anthony A. Main; Burt L. Crockett; Ann Oneta Haehn; Michael R. McIntyre; John Fitzgerald Baker; William T. Donovan, Jr.; Richard W. Lindgren, Jr.; Wayne C. McAvoy, all of Colorado Springs, Colo.

[73] Assignee: MCI Communications Corporation, Del.

[21] Appl. No.: 08/772,855

[22] Filed: Dec. 24, 1996

[51] Int. Cl.⁶ .................................................. G06F 11/34
[52] U.S. Cl. ...................... 705/11; 395/200.54; 395/676; 395/185.1
[58] Field of Search ........................ 705/11; 395/200.54, 395/676, 185.1

[56] References Cited

U.S. PATENT DOCUMENTS

| | | | |
|---|---|---|---|
| 4,955,070 | 9/1990 | Welsh et al. | 455/2 |
| 4,996,703 | 2/1991 | Gray | 379/40 |
| 5,036,852 | 8/1991 | Leishman | 600/301 |
| 5,065,140 | 11/1991 | Neuburger | 340/634 |
| 5,291,492 | 3/1994 | Andrews et al. | 370/259 |
| 5,374,951 | 12/1994 | Welsh | 348/4 |
| 5,381,470 | 1/1995 | Cambray et al. | 379/216 |
| 5,442,730 | 8/1995 | Bigus | 706/19 |
| 5,535,322 | 7/1996 | Hecht | 705/1 |
| 5,542,088 | 7/1996 | Jennings, Jr. et al. | 395/673 |
| 5,737,728 | 4/1998 | Sisley et al. | 705/8 |
| 5,745,110 | 4/1998 | Ertemalp | 345/340 |
| 5,748,884 | 5/1998 | Royce et al. | 395/185.1 |

*Primary Examiner*—Kenneth S. Kim

[57] ABSTRACT

A system and method for monitoring the performance of selected data processing jobs, comparing actual performance against the Service Level Agreement (SLA) to which each monitored job belongs, identifying discrepancies, and analyzing impacts to other jobs in a job stream. The present invention, also referred to as the Automated SLA Monitor (ASM), is a distributed computing platform comprising one or more Production Consoles for extracting job performance data from the production mainframe computers (or production midrange computers in other embodiments), one or more Production Servers for housing databases, one or more Maintenance Workstations for entering and maintaining SLA data, and one or more Client Workstations for presenting selected data to the user. When a job that is part of a SLA causes a delay, the ASM, by monitoring jobs of selected SLAs and production computer platforms, notifies the user of any problem with a selected SLA job, identifies the SLA critical path of which the job is part, along with all downstream dependent jobs, and determines the impact on the SLA of dependent jobs. The ASM reports these impacts to the user by automatically notifying the user if the SLA is in danger of not being met. The ASM also notifies the user of abnormal processing based upon actual performance of a job in previous executions by averaging prior run data and comparing the results to the current performance of a job to determine if the job is running faster or slower than normal.

12 Claims, 9 Drawing Sheets

AUTOMATED SLA PERFORMANCE ANALYSIS MONITOR WITH IMPACT ALERTS ON DOWNSTREAM JOBS

CROSS-REFERRENCE TO OTHER APPLICATIONS

The following application of common assignee contains some common disclosure as the present application.

"Integrated Cross-Platform Batch Management System," application Ser. No. 08/672,813, filed Jun. 28, 1996, incorporated herein by reference in its entirety.

BACKGROUND OF THE INVENTION

1. Field of the Invention

The present invention relates generally to network communications, and more particularly to automating a process for monitoring data processing jobs that are part of a Service Level Agreement (SLA) to ensure prompt completion of SLA jobstreams.

2. Related Art

Business enterprises using extensive data processing platforms commonly employ Production Operations personnel to ensure the successful initiation and execution of data processing jobs. The data processing jobs are computer programs that may run on mainframe or midrange computers, and perform business-critical tasks, such as billing and order entry. Jobs may be on-line jobs that run in real-time, or they may be batch jobs that run according to a schedule or other dependency. Often a business process is performed by a job stream, and thus, many jobs are dependent on the successful completion of previous jobs. A job stream is time-sensitive, and must run according to a strict schedule.

Service Level Agreements (SLAs) are contracts used between Production Operations and the client organizations that are responsible for each application. SLAs specify certain parameters of job performance and execution, such as start/end times, to ensure that job streams are executed successfully. It is critical that Production Operations closely monitor job execution to ensure that the critical path of each job stream is executed according to its SLA. If a job is late in starting, slow to execute, or abnormally terminates, it is important for Production Operations to determine this and analyze any impacts to ensure that downstream dependencies are accounted for and impacts are minimized.

Currently, the process of monitoring job execution, comparing against SLAs, and managing downstream jobs in a critical path is a very effort-intensive, manual process. Production Operations personnel must go through paper logs of SLA specifications and manually compare them with job performance data. By the time the Production Operations personnel notice a job ABENDed or started late, the impact to downstream jobs may have already made the SLA impossible to meet. If a job abnormally terminates and must be restarted, the impact to downstream jobs must be quickly analyzed so that appropriate actions, such as starting a job earlier than scheduled, may be taken. What is needed is an automated process to monitor job execution while comparing each job against its SLA in order to manage downstream jobs; related to the SLA accordingly.

SUMMARY OF THE INVENTION

Briefly stated, the present invention is directed to a system and method for monitoring the performance of selected data processing jobs, comparing actual performance against the Service Level Agreement (SLA) to which each monitored job belongs, identifying discrepancies, and analyzing impacts to other jobs in a job stream. The present invention monitors jobs that run on multiple platforms, such as MVS, UNIX, etc. The present invention is used to monitor both online and batch jobs that are part of a SLA.

The present invention, also referred to as the Automated SLA Monitor (ASM), is a distributed computing platform comprising one or more Production Consoles for extracting job performance data from the production mainframe computers (or production midrange computers in other embodiments), one or more Production Servers for housing databases, one or more Maintenance Workstations for entering and maintaining SLA data, and one or more Client Workstations for presenting selected data to the user. The Productions consoles are computers that, in addition to executing customized code, embody a software agent that carries and translates commands between the production consoles and the production computers. In a preferred embodiment, CA-Unicenter Star, manufactured by Computer Associates, is used as the software agent. Therefore, in a preferred embodiment, the production consoles are referred to as Unicenter Star Consoles. The Maintenance Workstations provide a convenient and efficient method of selecting jobs to be monitored, and entering and modifying SLA performance data.

When a job that is part of a SLA causes a delay, perhaps due to repeated ABENDS and restarts, the ASM automates the process that would otherwise be manual. The ASM monitors jobs of selected SLAs and production computer platforms. It notifies the user of any problem with a selected SLA job, identifies the SLA critical path of which the job is part, along with all downstream dependent jobs, and determines the impact on the SLA of dependent jobs. The ASM reports these impacts to the user by automatically notifying the user if the SLA is in danger of not being met (i.e., if the SLA job stream may not complete on time).

The present invention also determines abnormal processing based upon actual performance of a job in previous executions. Prior run and average run time data is collected from the production mainframe/midrange computers by a Unicenter Star Console. The prior run data specifies the actual performance of a job in its previous execution. The average run time averages data from these prior runs and compares the resultant average to the current performance of a job. If the job is running faster or slower than normal, the user is notified of this abnormal processing.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the digit(s) to the left of the two rightmost digits in the corresponding reference number.

BRIEF DESRCIPTION OF THE FIGURES

The present invention will be described with reference to the accompanying drawings, wherein.

Figure 4:
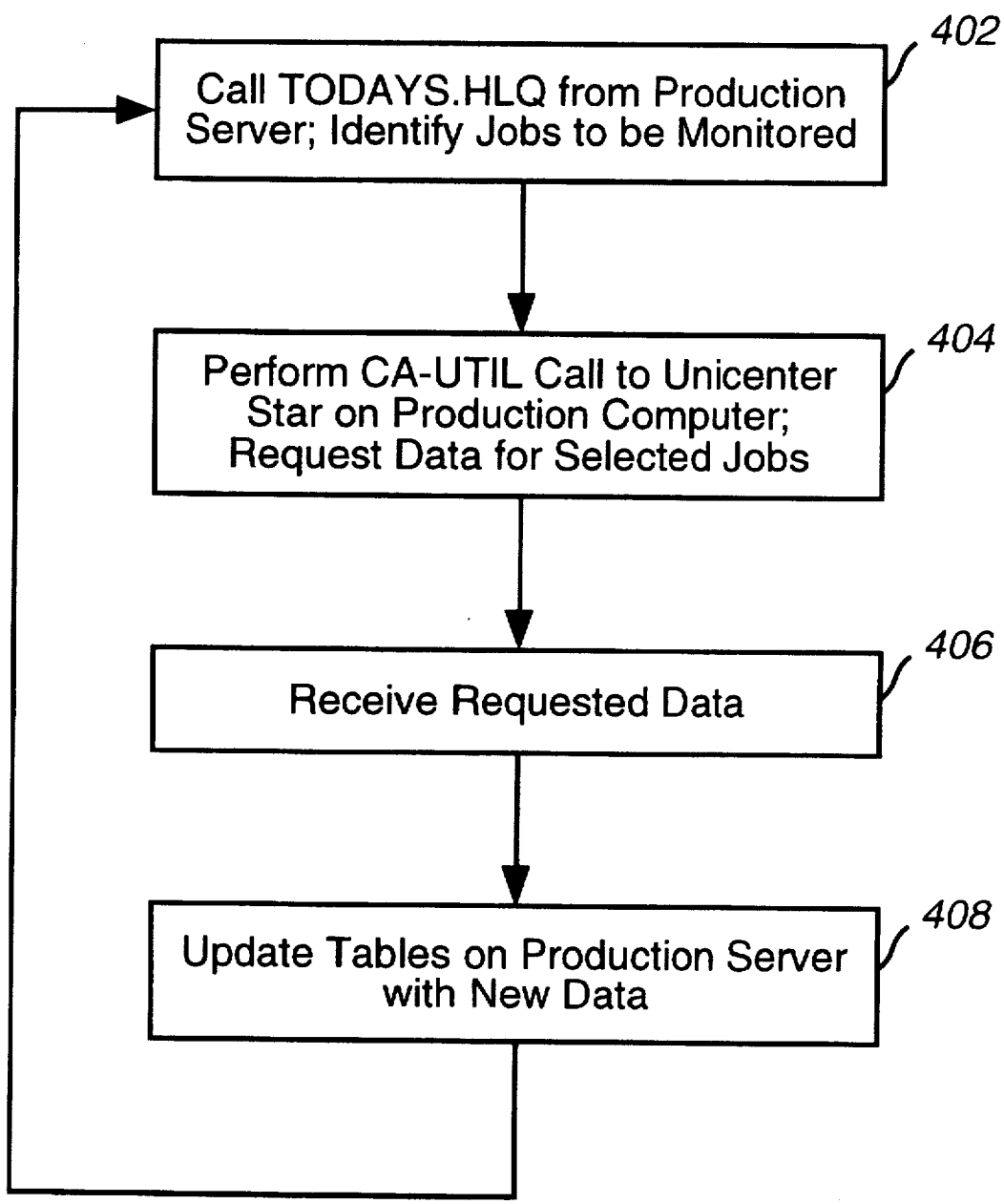
Figure 5:
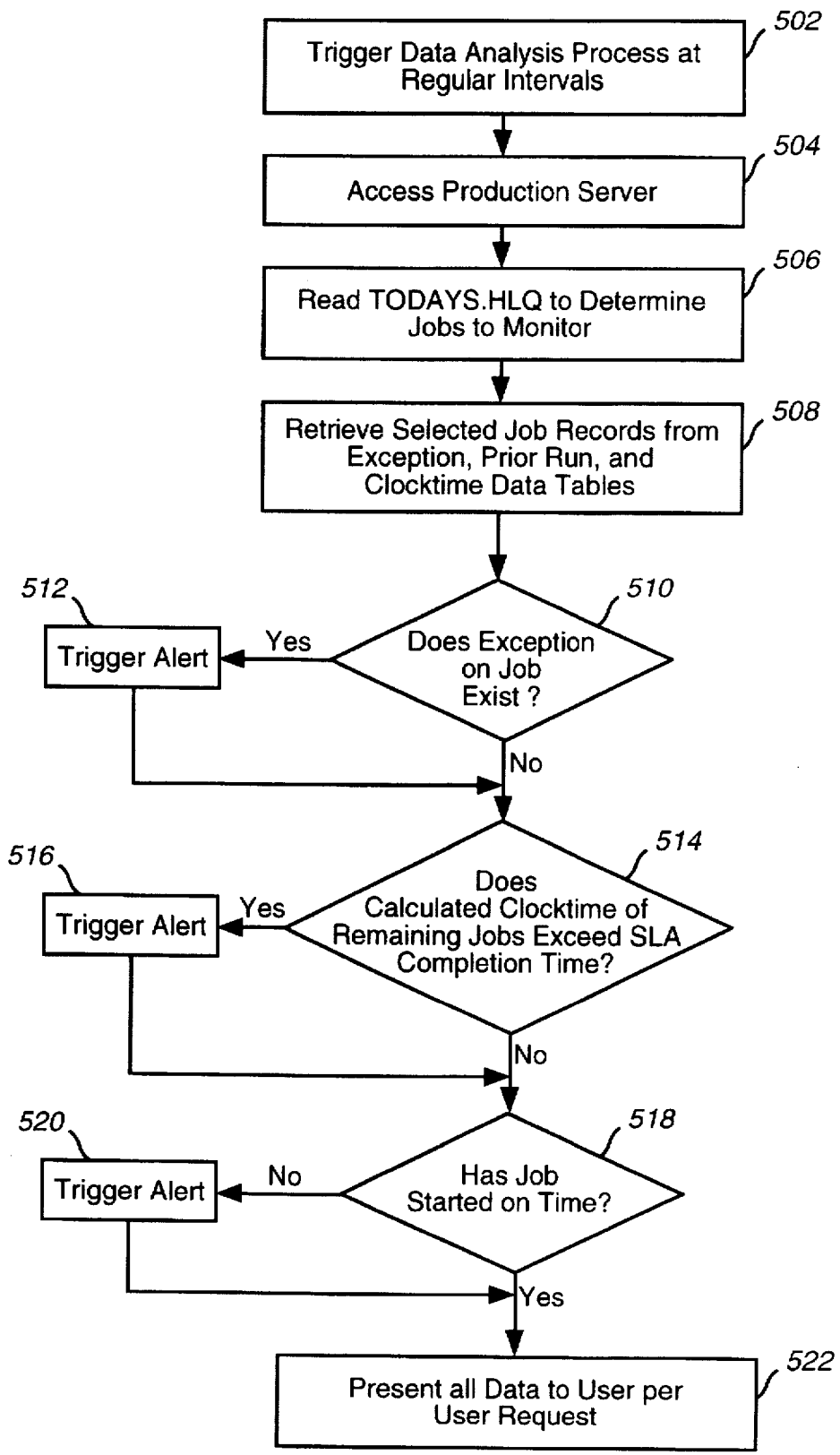
Figure 6:
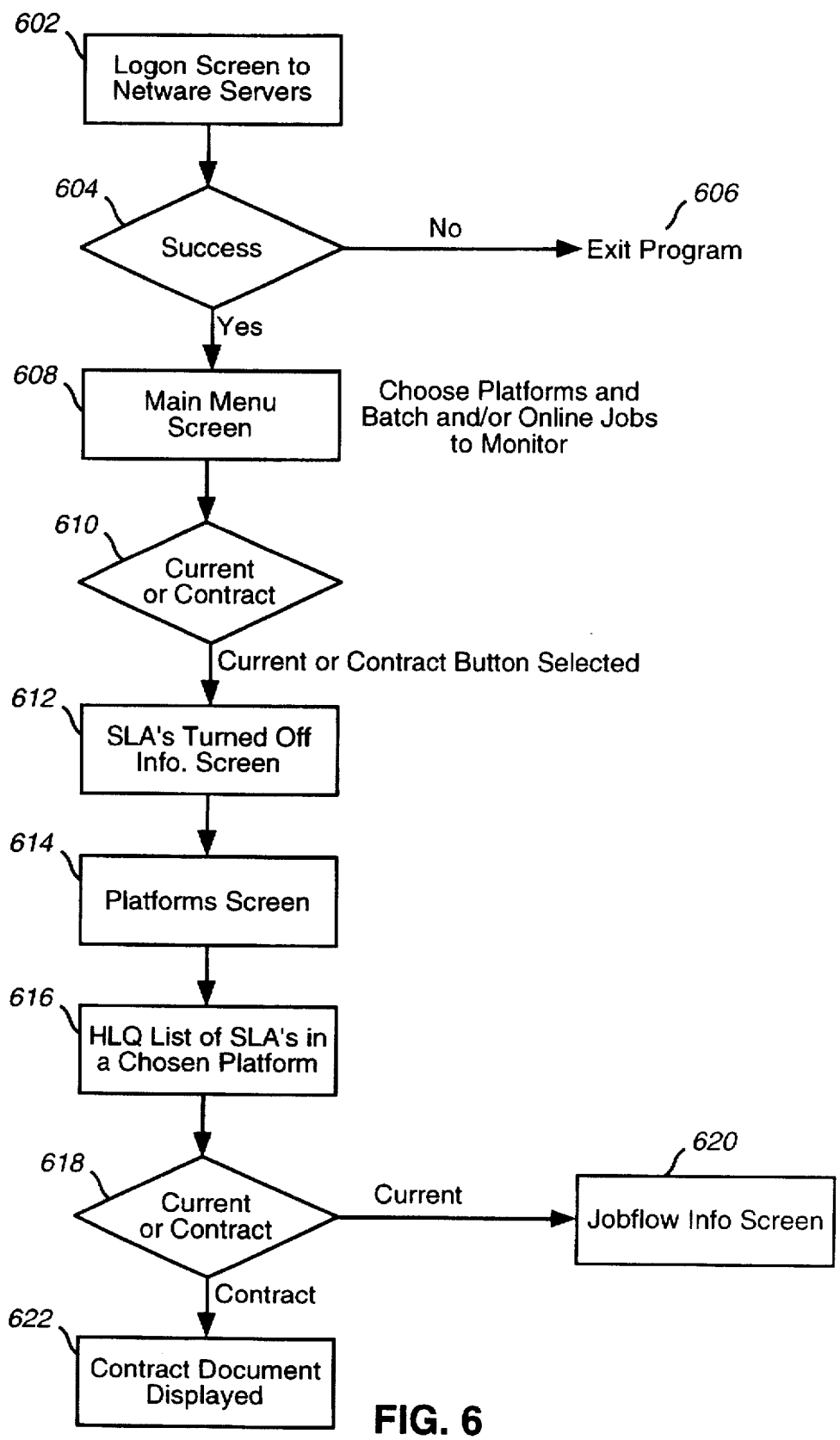
Figure 7:
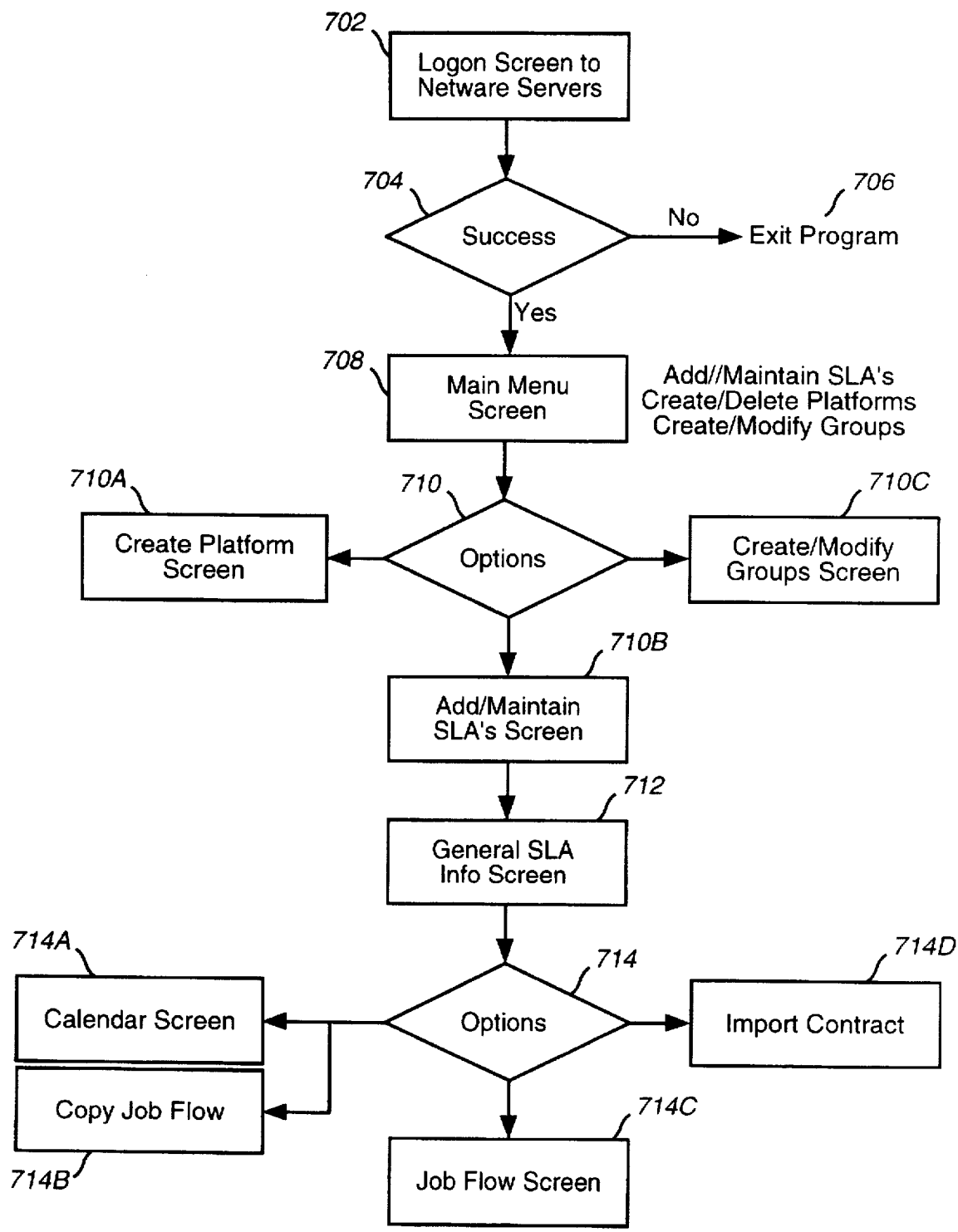
Figure 8:
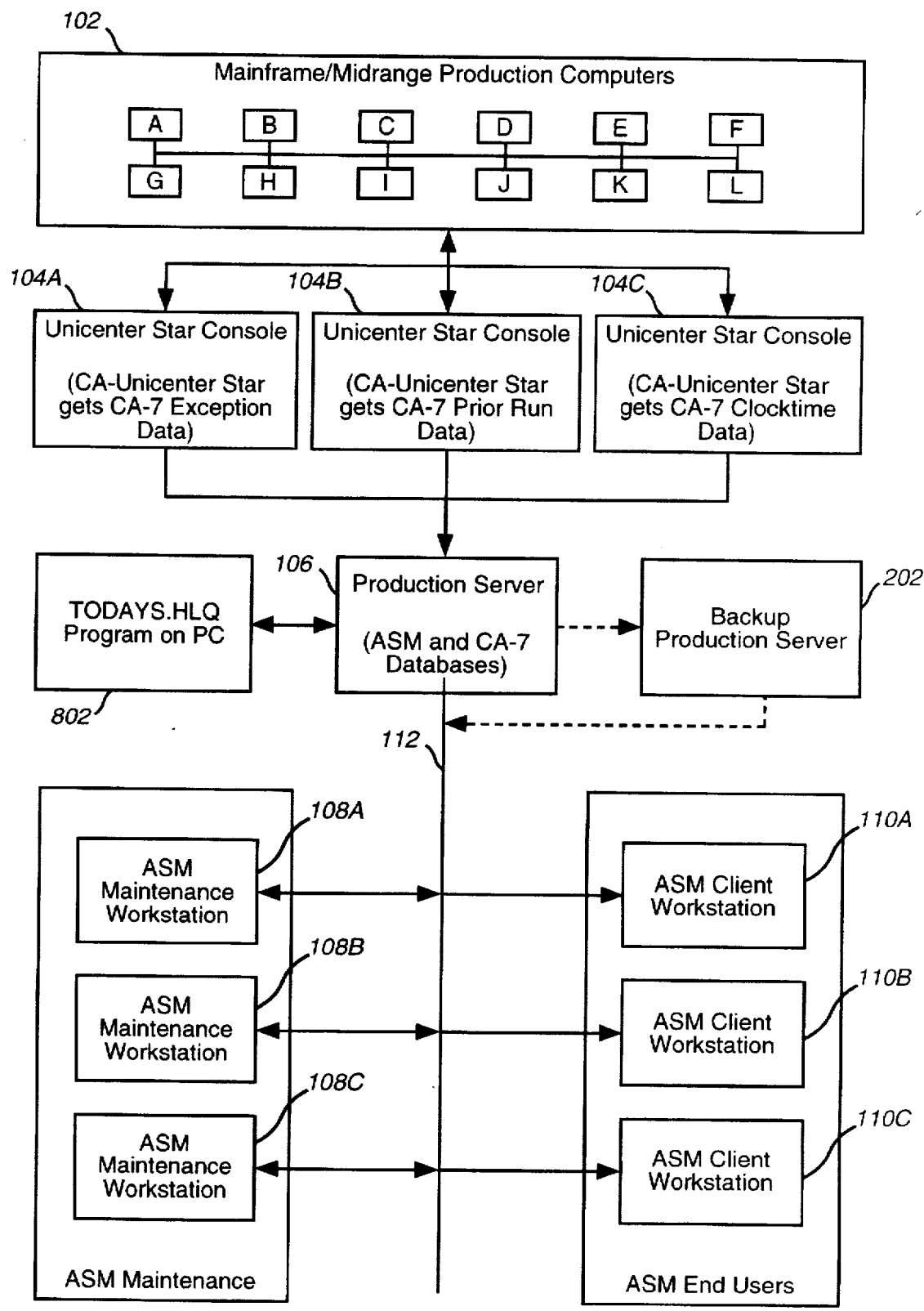
Figure 9:
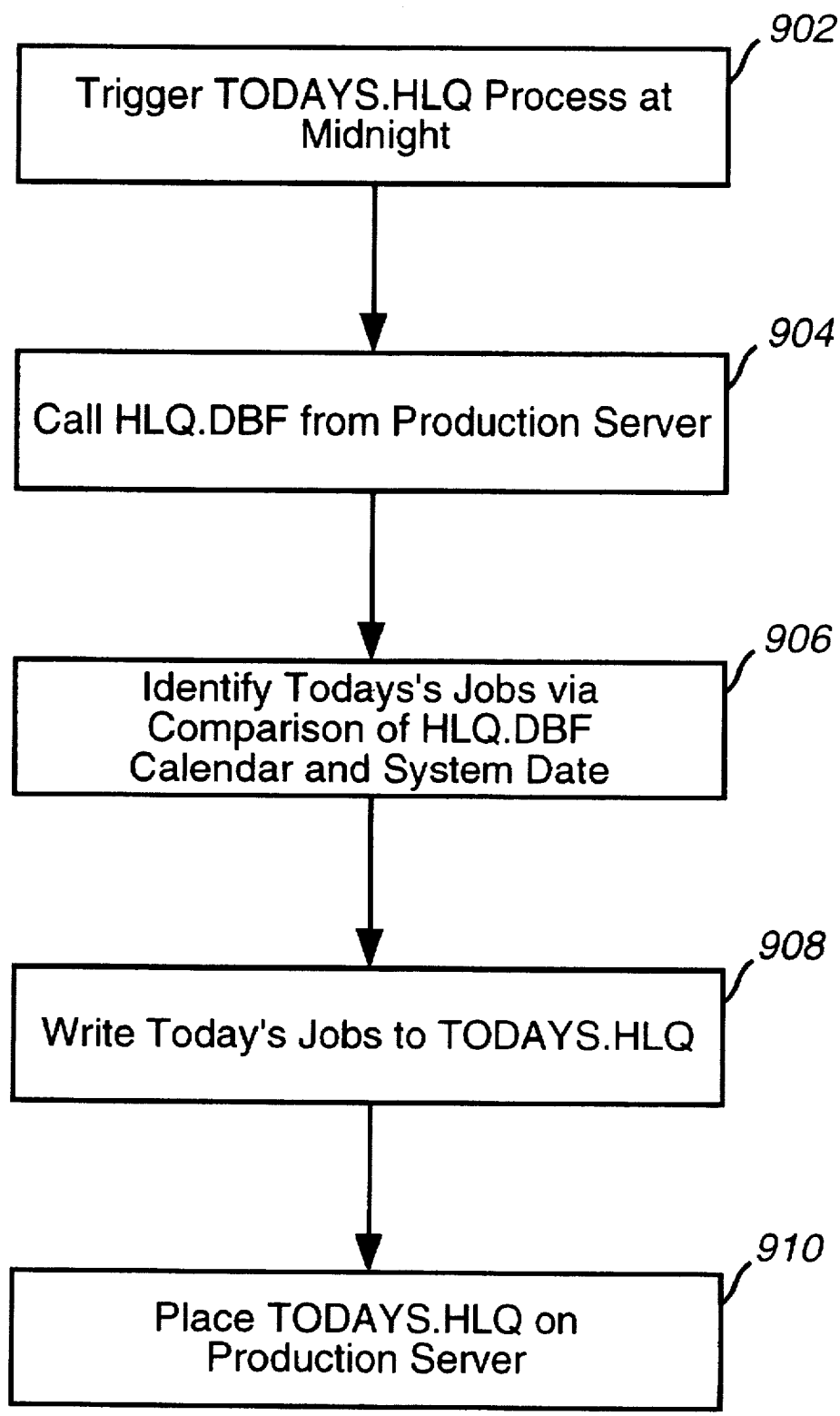

FIG. 4 flowchart illustrating the continuous process performed by each of the Unicenter Star consoles;

FIG. 5 flowchart illustrating the periodic data analysis process performed by each of the ASM client workstations to retrieve and analyze data from the production server;

FIG. 6 is a flowchart illustrating the process performed by each of the ASM client workstations to present the user with data and provide user navigation;

FIG. 7 is a flowchart illustrating the process performed by each of the ASM maintenance workstations;

FIG. 8 is a block diagram illustrating another embodiment of the present invention; and FIG. 9 is a flowchart illustrating the TODAYS.HLQ process.

DETAILED DESCRIPTION OF THE PREFERRED EMBODIMENTS

The preferred embodiment of the present invention is discussed in detail below. While specific configurations are discussed, it should be understood that this is done for illustration purposes only. A person skilled in the relevant art will recognize that other components and configurations may be used without departing from the spirit and scope of the invention.

The present invention is a system and method for automating the process of monitoring the performance of data processing jobs according to Service Level Agreements (SLAs). The present invention monitors the performance of selected data processing jobs, compares actual performance against a Service Level Agreement (SLA) to which each monitored job belongs, identifies discrepancies, and analyzes impacts to other jobs in a job stream.

The present invention, ASM, assists Production Operations with the tasks of monitoring jobs that are part of an SLA and ensuring that SLA jobstreams complete in time to meet the SLA. ASM prevents Production Operations personnel from going through paper logs of SLA specifications and manually comparing them with job performance data. ASM allows Production Operations personnel to proactively monitor SLA jobs in a critical path (a critical path consisting of all jobs directly triggered from the initial job in the stream to the final SLA job), and take immediate action to correct a problem before the SLA is missed.

Figure 1:
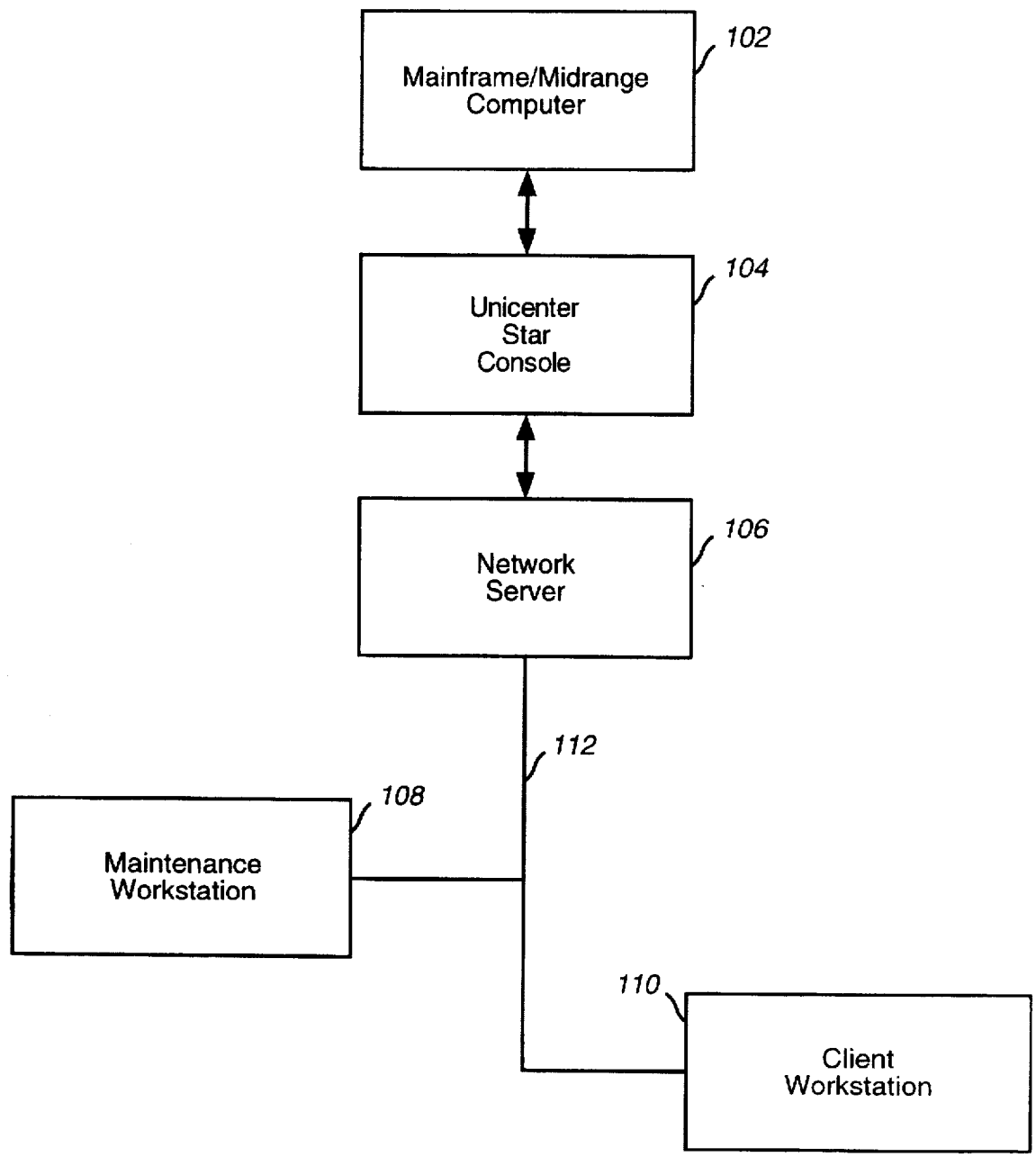
FIG. 1 illustrates a high level block diagram of the present invention.

A simplified block diagram of the present invention is shown in FIG. 1. The present invention comprises a production computer 102, a production console 104, a production server 106, a maintenance workstation 108, a client workstation 110, and a local area network 112. The production computer 102 is a mainframe or midrange computer on which a company's production jobs are executed. In a preferred embodiment, a Computer Associates (CA) product known as CA-7 and/or CA-Unicenter operates on the production computer 102. CA-7 and CA-Unicenter are well known to persons skilled in the relevant art(s) and are used to schedule jobs, collect job performance data and identify job processing exceptions. Other produces having this functionality could alternatively be used. Job performance data includes runtimes and return codes. Exceptions include ABENDs, terminations, and error codes. The Unicenter Star console 104 is used to extract job performance data from the production computer 102. The Unicenter Star console runs another CA product known as CA-Unicenter Star. CA-Unicenter Star is a software agent that carries and translates commands from the Unicenter Star console 104 to other CA products, such as CA-7 and/or CA-Unicenter on the production computer 102. A component of CA-Unicenter Star also runs on the production computer 102 to receive commands from the Unicenter Star console 104, retrieve the requested data from CA-7 running on the production computer 102, and transmit this data back to the Unicenter Star console 104. The Unicenter Star console 104 is connected to the production computer 102 via conventional data communication methods, such as IBM's SNA, dialup access via modems, or TCP/IP. The Unicenter Star console 104 continuously retrieves job performance and exception data from CA-7 and/or CA-Unicenter on the production computer 102. It should be understood that the CA software described herein could alternatively be implemented using other software performing the functions described herein.

The production server 106 is a database server that houses a number of databases for storing job performance data collected via the Unicenter Star console 104 and SLA data collected via the maintenance workstation 108. Job performance data specifies the actual performance (runtime, return codes, exceptions) of a job's current and previous executions. SLA data specifies the agreements reached by Production Operations personnel and client organizations pertaining to the performance objectives of jobs. These agreements state when each job in a SLA jobstream should start and end. Such SLA data, including job dependencies, are entered into the maintenance workstation 108 and are stored in databases in the production server 106. The production server 106 is embodied in a server-grade personal computer (PC) or midrange computer running with a network operating system, such as Netware or Microsoft Windows NT. Both Netware and Microsoft Windows NT are well known to persons skilled in the relevant art(s). An application program, preferably written in the well known IBM REstructured EXtended EXecutor (REXX) programming language, uses CA-Unicenter Star to retrieve certain data from CA-7 on each production computer 102 and place this data in selected databases on the production server 106. Alternatively, the REXX program's function may be written in Visual Basic, C++, CA-BLE or other computer software languages. This process is performed continuously by the REXX program on the Unicenter Star console 104. A detailed description of this process is described below. The production server 106, in addition to storing actual and SLA job performance data, presents this data to the end user in a unique and useful manner via the client workstation 110. An application program runs on the production server 106 to compare actual job performance data with SLA data, identify discrepancies, and identify impacts. These results are then presented to the user via the client workstation 110.

The maintenance workstation 108, used to load data pertaining to SLAs into databases on the production server 106, allows the user to specify the parameters of each SLA. SLA parameters include jobname, start/end times, and the production computer used for job execution (if more than one production computer is used in the system). The user also has the option of selecting which SLAs are to be monitored by the ASM.

The client workstation 110 is used by Production Operations personnel for automated SLA monitoring. The client workstation 110 retrieves and analyzes selected data from the databases located on the production server 106. The client workstation 110 presents the actual performance of jobs, SLA performance of jobs, notification of any discrepancies or problems (delays, ABENDs, etc.), and impacts to downstream jobs to the user.

Both the maintenance workstation 108 and the client workstation 110 are connected to the production server 106 via a local area network (LAN) 112. The maintenance workstation 108 and the client workstation 110 are preferably embodied in standard IBM compatible PCS equipped with an operating system and LAN software/hardware for communicating with the production server 106. The operating system for the PCS is preferably Windows NT. Other PC operating systems, such as IBM's OS/2, may also be used.

Figure 2:
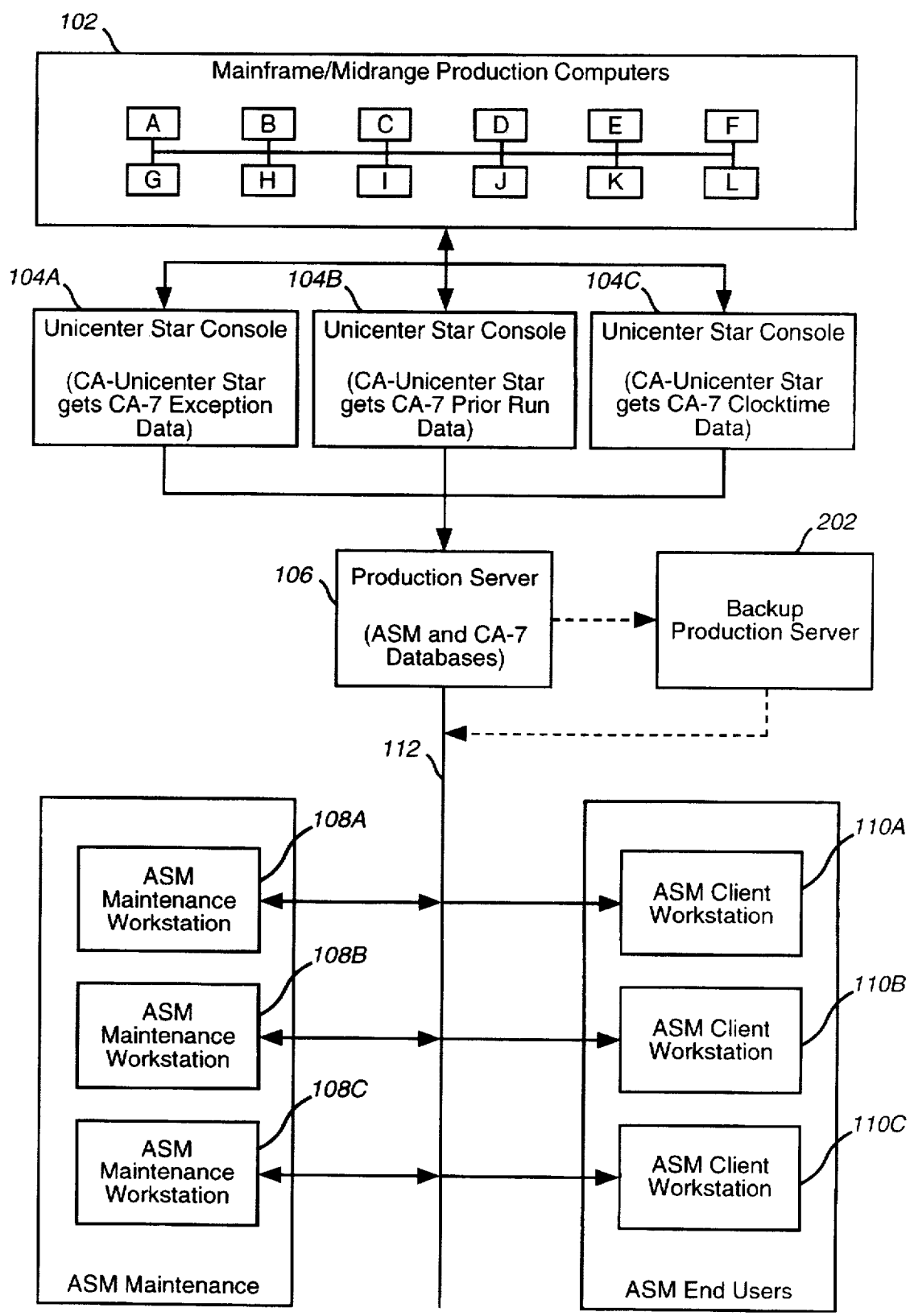
FIG. 2 is a block diagram illustrating the system architecture of a preferred embodiment of the present invention.

A preferred embodiment of the present invention is shown in FIG. 2. The preferred embodiment of the present invention contains a plurality of production computers 102A–102L, three Unicenter Star consoles 104A–104C, a production server 106, a backup production server 202, a plurality of maintenance workstations 108A–108C, a plurality of client workstations 110A–110C, and a LAN 112. The basic functionality of each component is identical to the descriptions indicated above. The production computers 102A–102L are mainframe and/or midrange computers in which production jobs execute. Each production computer, 102A–102L, executes CA-7 to schedule jobs, collect job performance data and identify job processing exceptions. The Unicenter Star consoles 104A–104C are connected to each production computer 102A–102L via standard data communication methods, such as IBM's SNA, dialup access via modems, or TCP/IP. The three Unicenter Star consoles 104A–104C are used to implement three separate data retrieval functions.

Unicenter Star console 104A retrieves job exception data from the production computers' (102A–102L) CA-7 programs. This data includes job ABENDs, error codes, and terminations. A system and process for retrieving job exception data from production computers and notifying the user is disclosed in a copending application entitled "Integrated Cross-Platform Batch Management System," application serial number 08/672813, (Atty. Docket No. COS-96-001 (1575.0920000)) incorporated herein by reference in its entirety.

Unicenter Star console 104B retrieves prior run data from the production computers' (102A–102L) CA-7 programs. This data specifies the performance of the most recent execution of a job. The data includes jobname, start time, end time, and completion status codes.

Unicenter Star console 104C retrieves clocktime data from the production computers' (102A–102L) CA-7 programs. This data specifies the average processing time for a job. CA-7 tracks the last five executions of a job, and averages the processing time. This serves as a benchmark of that job's normal processing.

Even though it is preferable to have three distinct Unicenter Star consoles 104A–104C performing the functions of retrieving job exceptions, prior run data, and clocktime data, all three functions may be performed on a single console (as described above in the simplified block diagram of FIG. 1), or on multiple consoles. Alternatively, multiple redundant consoles for each function may also be used, if processing volume requires.

In the preferred embodiment, the production server 106 houses five main databases. A first database stores exception data collected by Unicenter Star console 104A. A second database stores prior run data collected by Unicenter Star console 104B. A third database stores clocktime data collected by Unicenter Star console 104C. A fourth database stores data specifying job flows for each SLA collected from the maintenance workstations 108A–108C. A fifth database stores the High Level Qualifiers (HLQs)/Application Groups of SLA jobs that are to be monitored each day, along with a calendar that specifies when these jobs are to be run. This data is also collected from the maintenance workstations 108A–108C. An auxiliary process which creates this data is described below.

A backup production server 202, redundant with the production server 106, may be used for backup purposes. The production server 106 downloads its database contents to the backup production server 202 on a periodic basis or on demand. In the event of a failure with the production server 106, the backup production server 202 assumes control and serves data to the client workstations 110A––110C.

Even though one maintenance workstation and one client workstation are sufficient (as shown in FIG. 1), multiple maintenance and client workstations are preferred, depending on the number of maintenance users and end users, respectively.

Figure 3:
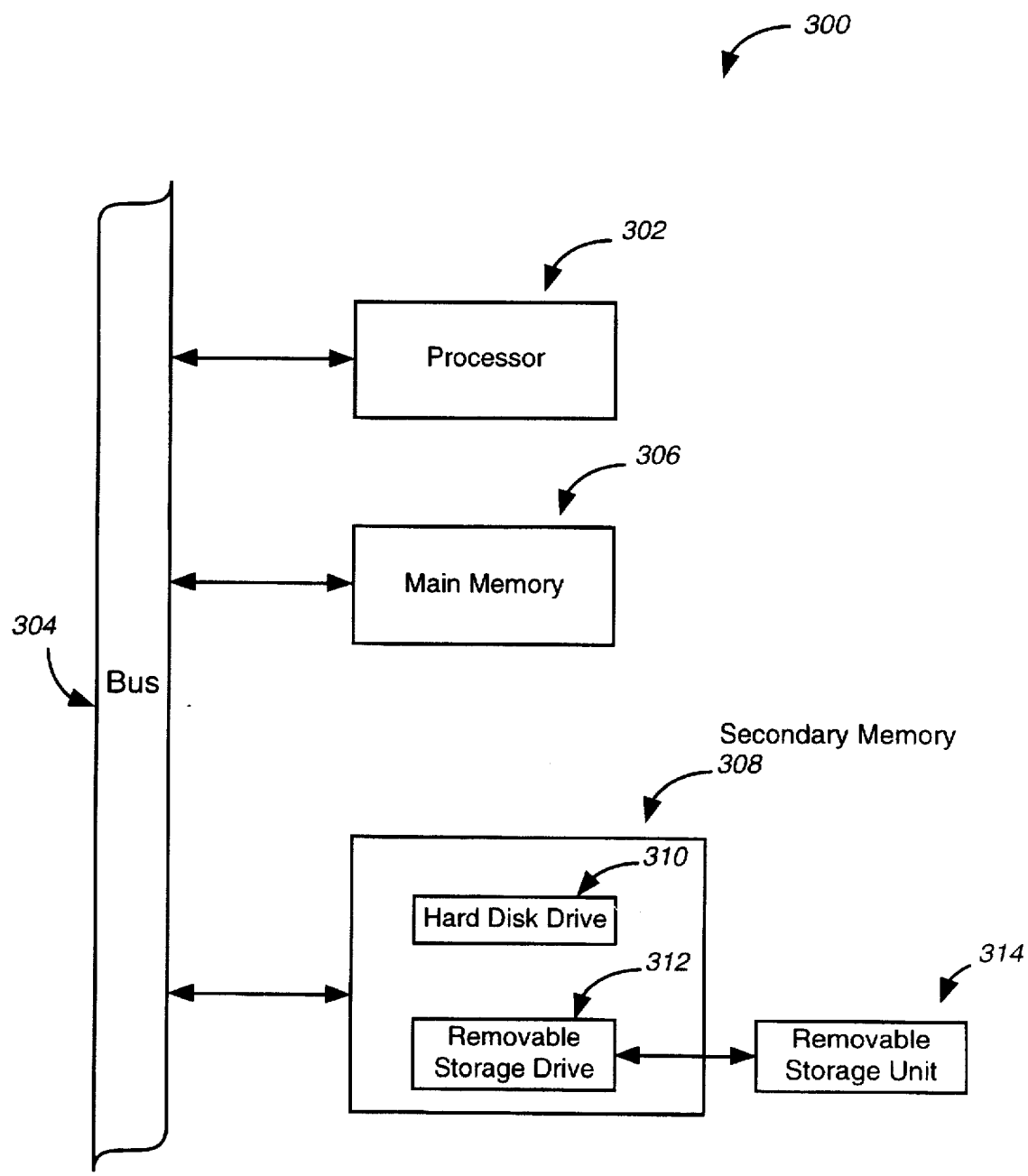
FIG. 3 illustrates an exemplary computer system embodied within the system architecture of the present invention.

The client workstation 110, the maintenance workstation 108, and the production server 106 can be implemented, at least partially, using a computer system, such as the computer system 300 shown in FIG. 3. This computer system can also be used to implement the Unicenter Star console 104A–104C. Alternatively, the Unicenter Star console 104A–104C can be implemented using a separate computer system, such as the computer system 300 shown in FIG. 3.

The computer system 300 includes one or more processors, such as processor 302. The processor 302 is connected to a communication bus 304. The computer system 300 also includes a main memory 306, preferably random access memory (RAM), and a secondary memory 308. The secondary memory 308 includes, for example, a hard disk drive 310 and/or a removable storage drive 312, representing a floppy disk drive, a magnetic tape drive, a compact disk drive, etc. The removable storage drive 312 reads from and/or writes to a removable storage unit 314 in a well known manner.

Removable storage unit 314, also called a program storage device or a computer program product, represents a floppy disk, magnetic tape, compact disk, etc. The removable storage unit 314 includes a computer usable storage medium having stored therein computer software and/or data.

Computer programs (also called computer control logic) are stored in main memory and/or the secondary memory 308. Such computer programs, when executed, enable the computer system 300 to perform the features of the present invention as discussed herein. In particular, the computer programs, when executed, enable the processor 302 to perform the features of the present invention. Accordingly, such computer programs represent controllers of the computer system 300.

In another embodiment, the invention is directed to a computer program product comprising a computer readable medium having control logic (computer software) stored therein. The control logic, when executed by the processor 302, causes the processor 302 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant art.

A flowchart 400 illustrating the continuous process performed by each of the Unicenter Star consoles 104A–104C is shown in FIG. 4. This process is carried out by a computer program preferably written in the well known IBM language REXX. REXX is useful for programs that utilize CA products, such as CA-Unicenter Star and CA-7 through the use of CA's DDL's (Dynamic Link Libraries). However, other computer programming languages which are capable of using DDL's could alternatively be used. The process runs as a continuous loop, constantly making calls to each production computer 102A–102L to retrieve the most current data. The process is performed on each Unicenter Star console 104A–104C, but varies according to the data being retrieved.

In step 402, the Unicenter Star consoles 104A–104C call up a table identified as TODAYS.HLQ on the production server 106. The TODAYS.HLQ table lists each SLA job that is to be monitored for the current day. Jobs are listed by jobname. By reading this table, the Unicenter Star consoles 104A–104C identify each job to be monitored for the current day. This process limits the number of jobs for which data must be collected, thereby making the overall ASM process more efficient. Only jobs that run on the current day are monitored.

In step 404, the Unicenter Star consoles 104A–104C perform a CA-UTIL call to the Unicenter Star module on each production computer 102A–102L. A CA-UTIL call is a standard function of CA-Unicenter Star. The CA-UTIL call is made to the Unicenter Star module on each of the production computers 102A–102L to retrieve certain data from the CA-7 and/or CA-Unicenter module that is running on each production computer 102A–102L. For example, if the production computer 102A is an IBM 3090 mainframe running on MVS, the CA-UTIL call is made to a Unicenter Star for MVS module running on mainframe 102A.

The current version of CA-Unicenter Star only allows one type of call to be made at a time. Therefore, the ASM uses three different Unicenter Star consoles 104A–104C, one to perform each type of call. The Unicenter Star console 104A makes a call for exception data. Exception data is used to identify jobs that have experienced an exception in processing. This includes ABENDs, user termination, system termination, and completion with error codes. The data retrieved for exception data includes jobname, schedule identifier (SCHID) if the production computer 102A–102L is MVS, process identifier if the production computer 102A–102L is UNIX, completion time, and exception status code.

The Unicenter Star console 104B makes a call for prior run data. Prior run data is used to determine the most recently completed job in a jobstream, and to determine the status of that job, including start and end times. The data retrieved for prior run data includes jobname, schedule identifier (SCHID) if the production computer 102A–102L is MVS, process identifier if the production computer 102A–102L is UNIX, completion time, and completion status (return code).

The Unicenter Star console 104C makes a call for clocktime data. Clocktime data is the average completion time of the last five executions of each job. CA-7 tracks the time needed to complete for each job's previous five executions, and then averages these times. The data is used to determine the normal processing time for a job. The data retrieved for clocktime data include jobname, schedule identifier (SCHID) if the production computer 102A–102L is MVS, process identifier if the production computer 102A–102L is UNIX, and clocktime (average completion time).

In step 406, the Unicenter Star console 104A–104C receives the requested data from the Unicenter Star module on the production computers 102A–102L. Thus, while the process is performed by each Unicenter Star console 104A–104C, the type of call made in step 404 and the type of data received in step 406 differ, according to the particular Unicenter Star console 104A–104C.

In step 408, the data is written to the appropriate databases on the production server 106. There are five main tables on the production server 106. Exception data collected by the Unicenter Star console 104A is written to an exception data table. Prior run data collected by the Unicenter Star console 104B is written to a prior run data table. Clocktime data collected by the Unicenter Star console 104C is written to a clocktime data table. Also on the production server 106 is an SLA jobflow table that identifies the jobflow of each SLA, and a table identified as HLQ.DBF. This table identifies every SLA job that needs monitoring, and each job's schedule for execution according to its SLA. Data for the SLA jobflow table and the HLQ.DBF table are entered by the user via the maintenance workstations 108A–108C. The process is described below.

The entire process of steps 402 through 408 is repeated continuously by each Unicenter Star console 104A–104C. This process constantly updates job data that is kept on the production server 106. The data is then accessible to users via the client workstations 110A–110C. The users represent the Production Operations monitoring personnel who must ensure that jobs get completed in accordance with SLAs. The client workstations 110A–110C provide the users with the means for viewing the data that is produced by the automated process of the ASM.

The client workstations 110A–110C also perform a periodic process that collects pertinent data from the tables in the production server 106, analyzes this data to determine which jobs are negatively impacting a SLA, and triggers flags for the user to designate a SLA in jeopardy. This process is referred to as the periodic data analysis process.

A flowchart illustrating the periodic data analysis process 500 performed by each of the client workstations 110A–110C is shown in FIG. 5. The process is performed on a regular periodic basis, frequent enough to provide the user at the client workstation 110A–110C with current data. In a preferred embodiment, this process is performed every 15 minutes, although other time intervals are also contemplated.

In step 502, the data analysis process 500 is triggered per schedule, such as every 15 minutes. In step 504, the client workstation 110A–110C accesses the production server 106 via LAN 112. In step 506, the client workstation 110A–110C reads the TODAYS.HLQ table to determine which jobs are to be monitored for the current day.

In step 508, the client workstation 110A–110C retrieves records for the jobs selected in step 506. These records are retrieved from the exception, prior run, and clocktime data tables on the production server 106.

The determination as to whether an alert needs to be made on each job occurs in steps 510, 514, and 518. An alert is made if the job is negatively impacting the SLA (i.e., the job is putting successful on-time completion of the SLA jobstream in jeopardy). Each job record retrieved in step 508 is run through each of these steps.

In step 510, the job record is tested to determine if an exception on the job exists. This is determined from the exception data. If an exception exists, an alert is triggered in step 512.

In step 514, the job record is tested to determine if the calculated clocktime of all remaining jobs in the SLA jobstream exceeds the SLA completion time. The current system time is used as a base and then the last job in the SLA jobstream that completed is determined. This is determined from the prior run data. Then the remaining clocktimes from the clocktime data are added together to get an estimated completion time. If the estimated completion time exceeds the SLA completion time, an alert is triggered in step 516.

In step 518, the job record is tested to determine if a job that should have started by the current system time has started. If the job has not started, an alert is triggered in step 520. In step 522, all data that was collected in step 508, along with data calculated and derived in steps 510–520, are presented to the user in accordance with user request.

A flowchart illustrating the process performed by each of the client workstations 110A–110C to present the user with data and provide user navigation is shown in FIG. 6. In step 602, the user is presented with a Logon screen. This Logon screen allows a user access to the production server 106 if a valid user identification and password are entered. In step 604, the logon identification and password are tested for validity. If the logon is not successful, the program exits in step 606. If the logon is successful, the user is presented with the ASM main menu in step 608. The main menu allows the user to select the production computer 102A–102L platform to monitor. This selection may be made by selecting a specific production computer 102A–102L, by selecting all of the production computers 102A–102L, or by selecting an operating system (i.e., MVS). The user may also select to monitor batch jobs, online jobs, or both.

In step 610, the user is allowed to either monitor current jobs or view the contract. The contract refers to the SLA, which is entered into the maintenance workstation 108A–108C by Production Operations maintenance personnel and stored in the production server 106.

In step 612, the user is presented with a list of SLAs that have been turned off by maintenance personnel. The maintenance workstations 108A–108C allow maintenance personnel to turn off SLAs, which exclude them from being monitored. Reasons for turning off SLAs include an application group not wishing to run their scheduled job(s) during a certain time period or if an SLA has not been properly finalized. This list is used to notify the end-user that certain SLAs are not being monitored. SLAs are listed by application group (AI), platform (RKV), operating system (MVS), online vs. batch (O), and three-digit schedule identifiers (SCHIDs) which are used by CA-7 for reporting.

In step 614, the user is presented with all the production computer platforms that are being monitored. This information is updated every 15 minutes to alert the end-user of any discovered problems with SLAs. Platforms in which a SLA is in jeopardy are shown in red. This is one method of an alert. Alternatively, an alert may take on several different forms, such as highlighting, blinking, etc.

If a particular platform is selected from the screen, all SLAs that are being monitored on that platform are listed by their High Level Qualifiers (HLQs)/Application Groups in step 616. If a problem arises with an SLA, a "!!! Problem SLA !!!" warning will appear next to it. If a particular SLA is selected, the user may choose to monitor the current job performance for that SLA or view the contract of that SLA in step 618. If the user chooses to monitor current jobs, the user is presented with the current status of jobs in the selected SLA in step 620. If the user chooses to view the SLA contract, the document is displayed in step 622.

A flowchart illustrating the process performed by each of the maintenance workstations 108A–108C is shown in FIG. 7. The maintenance workstations 108A–108C are used by various Production Operations personnel to maintain and create/delete SLAs. In step 702, the user is presented with the Logon screen. The Logon screen allows a user access to the production server 106 if a valid user identification and password are entered. In step 704, the logon identification and password are tested for validity. If the logon is not successful, the program exists in step 706. If the logon is successful, the user is presented with the main menu in step 708. The main menu allows the user to create/delete platforms by selecting, in step 710A, the Create Platform Screen; add/maintain SLAs by selecting, in step 710B, the Add/Maintain SLA's Screen; or create/modify a group of platforms by selecting, in step 710C, the Create/Modify Groups Screen.

Maintaining of SLAs allows for general information to be entered as well as specific calendar information (to know when the SLA actually runs) and job flows for the actual SLA to be input. The user is presented with a general SLA information screen 712 that lists all currently entered SLAs and some of its more pertinent information, such as when the SLA should be running, whether the SLA has been turned off, etc.

If a particular SLA is chosen, the user has the option of creating a run calendar for the critical path by selecting, in step 714A, the Calendar Screen; copying all job(s) associated with the SLA (if most of them are the same), thus saving data entry time by selecting, in step 714B, Copy JobFlow; opening the associated job flow database for updating information and entering the actual jobs to be monitored by selecting, in step 714C, the Job Flow Screen; and importing a contract document onto the server for viewing the actual SLA by selecting, in step 714D, Import Contract.

FIG. 8 represents another block diagram of the system architecture, adding an additional component to the preferred embodiment of the present invention. A computer 802, is added that executes a program to create the TODAYS.HLQ table on a daily basis. In a preferred embodiment, computer 802 is a personal computer (PC) operating with Windows NT or Windows 95. The TODAYS.HLQ table is used to make the ASM process more efficient. It identifies which SLA jobs are to execute on the current day. The TODAYS.HLQ table is used by the Unicenter Star consoles 104A–104C to identify jobs for which data are to be collected. The TODAYS.HLQ table is also used by the client workstations 110A–110C to identify jobs for which records are to be retrieved from the production server 106.

A flowchart illustrating the TODAYS.HLQ process performed by computer 802 is shown in FIG. 9. Alternatively, this process may be performed on another computer that is already part of the ASM architecture, such as the production server 106 or the maintenance workstations 108A–108C.

In step 902, the program is triggered to execute each day at midnight. In step 904, the computer 802 calls the HLQ.DBF table on the production server 106. The HLQ.DBF table contains all jobs that are to be monitored, along with their execution schedule. This table is populated by the user via the maintenance workstations 108A–108C (previously described with reference to FIG. 7).

In step 906, the computer 802 identifies each job that is to be monitored on the current day by comparing the current system date with the schedule information in the HLQ.DBF table. In step 908, each job identified in step 906 is written to the table in the new updated version of TODAYS.HLQ. In step 910, TODAYS.HLQ is stored on the production server 106 for access by the Unicenter Star consoles 104A–104C and the client workstations 110A–140C. While various embodiments of the present invention have been described above, it should be understood that they hive been presented by way of example only, and not limitation. Thus, the breadth and scope of the present invention should not be limited by any of the above-described exemplary embodiments, but should be defined only in accordance with the following claims and their equivalents.

What is claimed is:

1. An automation method for monitoring data processing jobs that are part of Service Level Agreements (SLAs), comprising the steps of:
   (a) identifying which data processing jobs to monitor;
   (b) retrieving records from an exception data table, a prior run data table, and a clocktime data table for said identified data processing jobs;
   (c) triggering an alert when said identified data processing jobs are negatively impacting any of said SLAs;
   (d) displaying data related to said SLAs to a user per user's request; and
   (e) performing steps (a)–(d) at regular time intervals.

2. The method of claim 1 wherein step (c) comprises the steps of:
   (1) triggering an alert if an exception on said identified data processing jobs exists;
   (2) triggering an alert if estimated completion time exceeds SLA completion time; and
   (3) triggering an alert if a current job has not started on time.

3. The method of claim 2 wherein step (2) comprises the steps of:
   (i) determining calculated clocktime of remaining jobs in a SLA jobstream;
   (ii) summing said calculated clocktimes of said remaining jobs in said SLA jobstream to obtain said estimated completion time; and
   (iii) comparing said estimated completion time with said SLA completion time.

4. An automation system for monitoring data processing jobs that are part of Service Level Agreements (SLAs), comprising:
   means for identifying which data processing jobs to monitor;
   means for retrieving records from an exception data table, a prior run data table, and a clocktime data table for said identified data processing jobs;
   means for triggering an alert when said identified data processing jobs are negatively impacting any of said SLAs;
   means for displaying data related to said SLAs to a user per user's request; and
   means for monitoring said identified data processing jobs at regular time intervals.

5. The system of claim 4 wherein said means for triggering an alert comprises:
   means for triggering an alert if an exception on said identified data processing jobs exists;
   means for triggering an alert if estimated completion time exceeds SLA completion time; and
   means for triggering an alert if a current job has not started on time.

6. The system of claim 5 wherein said means for triggering an alert if estimated completion time exceeds SLA completion time comprises:
   means for determining calculated clocktime of remaining jobs in a SLA jobstream;
   means for summing said calculated clocktimes of said remaining jobs in said SLA jobstream to obtain said estimated completion time; and
   means for comparing said estimated completion time with said SLA completion time.

7. A distributed computing platform for automated Service Level Agreement monitoring, comprising:
   at least one production computer for executing data processing jobs;
   at least one computer console, wherein said computer console extracts job performance data from said production computer and is connected to said production computer via data communication lines;
   at least one production server connected to said computer console via a communication link, wherein said production server stores said job performance data extracted from said production computer and SLA job performance data;
   at least one maintenance workstation for loading data pertaining to SLAs on said production server;
   at least one client workstation for automating SLA monitoring and displaying actual performance of jobs, SLA performance of jobs, problems, and impacts to downstream jobs to a user; and
   a local area network (LAN), wherein said LAN connects said maintenance workstation and said client workstation to said production server.

8. The platform of claim 7, wherein said production server compares said actual performance data with SLA data, identifies discrepancies, and identifies impacts to downstream jobs.

9. The platform of claim 7, wherein said data communication links include one of SNA, dialup access via a modem, and TCP/IP.

10. A program storage device readable by a machine, tangibly embodying a program of instructions executable by the machine to perform method steps within a multiuser data processing system environment for monitoring data processing jobs that are part of Service Level Agreements (SLAs), the method steps comprising:
    (a) identifying which data processing jobs to monitor;
    (b) retrieving records from an exception data table, a prior run data table, and a clocktime data table for said identified data processing jobs;
    (c) triggering an alert when said identified data processing jobs are negatively impacting any of said SLAs;
    (d) displaying data related to said SLAs to a user per user's request; and
    (e) performing steps (a)–(d) at regular time intervals.

11. The program storage device of claim 10, wherein step (c) of said method steps comprises the steps of:
    (1) triggering an alert if an exception on said identified data processing jobs exists;
    (2) triggering an alert if estimated completion time exceeds SLA completion time; and
    (3) triggering an alert if a current job has not started on time.

12. The program storage device of claim 11, wherein step (2) of said method steps comprises the steps of:
    (i) determining calculated clocktime of remaining jobs in a SLA jobstream;
    (ii) summing said calculated clocktimes of said remaining jobs in said SLA jobstream to obtain said estimated completion time; and
    (iii) comparing said estimated completion time with said SLA completion time.

* * * * *

UNITED STATES PATENT AND TRADEMARK OFFICE
Certificate

Patent No. 5,893,905                      Patented: April 13, 1998

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Anthony A. Main, Colorado Springs, CO; Burt L. Crockett, Colorado Springs, CO; Ann O. Haehn, Colorado Springs, CO; Michael R. McIntyre, Colorado Springs, CO; John F. Baker, Colorado Springs, CO; William T. Donovan, Jr., Colorado Springs, CO; Richard W. Lindgren, Jr., Colorado Springs, CO; Wayne C. McAvoy, Colorado Springs, CO; and Debra P. Story, Colorado Springs, CO.

Signed and Sealed this First Day of February, 2000.

MENG-AI T. AN
                                                                        *SPE* Art Unit 2783